United States Patent Office 2,771,459
Patented Nov. 20, 1956

2,771,459

CATIONIC DERIVATIVES OF ITACONATE-DIENE COPOLYMERS

Fred W. Banes and Erving Arundale, Westfield, N. J., assignors to Esso Research and Engineering Company, a corporation of Delaware No Drawing. Application November 24, 1952, Serial No. 322,334

6 Claims. (Cl. 260—78.5)

This invention relates to derivatives of polymers of olefin polycarboxylic acid esters. More particularly, it relates to water-soluble hydrolysis and saponification derivatives of resinous copolymers of a major proportion of dimethyl itaconate and a minor proportion of butadiene or the like.

The copolymerization of various vinyl esters such as methyl acrylate or tri-butyl aconitate with diolefin hydrocarbons has been suggested previously in connection with the preparation of soft rubbery synthetic polymers. However, it has now been discovered that dimethyl itaconate behaves in an unexpected manner as compared with previously used vinyl esters and that by proper selection of the monomer ratio of dimethyl itaconate to diolefin, leather-like thermoplastic resins can be obtained which possess unusual oil resistance and excellent processing properties.

According to this invention resinous products are obtained by copolymerizing in aqueous emulsion about 65 to 90 parts by weight of dimethyl itaconate and about 35 to 10 parts by weight of a conjugated $C_4$ to $C_6$ diolefin such as butadiene-1,3, isoprene or dimethyl butadiene. Within the stated range copolymers prepared from 75 to 80 parts of dimethyl itaconate and 25 to 20 parts of butadiene-1,3 are particularly preferred. Minor amounts, e. g. 10 to 30 parts of the dimethyl itaconate may be replaced in the polymerization mixture by a third monomer such as styrene, methyl methacrylate, vinyl pyridine, isobutylene and the like.

The polymerization reaction is carried out by emulsifying the reaction monomers in an aqueous medium, the weight ratio of monomers to water being from about 2:1 to 1:10, ratios between 1:2 and 1:4 being usually preferred. Any commonly known emulsifying agent may be used herein in the usual manner. For example, about 0.5 to 8% by weight of monomers of an ammonium or an alkali metal soap of a saturated or unsaturated $C_8$ to $C_{24}$ fatty acid such as caprylic, carnaubic, lauric or mixed coconut oil acid can be used, but the sodium or potassium salts of oleic or stearic acids are preferred. In addition to or in place of the fatty acid soap, another emulsifier such as Daxad-11 (sodium salt of a formaldehyde condensation product of naphthalenes sulfonic acids) or sodium lauryl sulfate, sodium tetraisobutylene sulfonate, or aromatic alkyl sulfonate salts, etc. may be used to advantage.

The polymerization may be carried out at temperatures ranging from about —20° C. to +60° C., temperatures between 30° C. and 50° C. being preferred. Polymerizations at temperatures between —20° C. and +20° C. are hereafter referred to as "low temperature polymerizations." When the polymerization temperature is below the natural freezing temperature of the aqueous emulsion, it is necessary to add to the emulsion a sufficient amount of an anti-freeze agent to prevent the reaction mixture from freezing. Suitable anti-freeze agents are saturated mono- or polyhydric aliphatic alcohols of 1 to 3 carbon atoms, such as methanol, ethanol, ethylene glycol, propylene glycol, or glycerol. Ordinarily the polymerization times may vary between about 5 and 48 hours depending on temperature, degree of conversion desired, catalyst system and other known variables in the polymerization procedure, times of about 10 to 15 hours being ordinarily preferred. The total reaction may be carried to a conversion of about 50 to 100%, preferably 80 to 100%.

The catalyst used may be any one or a mixture of the known class of per-type or oxygen-liberating catalysts used in emulsion polymerizations such as hydrogen peroxide, benzoyl peroxide, cumene hydroperoxide, tertiary butyl hydroperoxide, potassium persulfate or other alkali persulfates or perborates or the corresponding ammonium salts. The oxygen-liberating catalyst is used in amounts ranging from about 0.03 to 2% based on the weight of monomers, catalyst concentration ranging from 0.3 to 0.5% of potassium or other alkali persulfates being preferred for polymerizations carried out above room temperature while concentrations of about 0.05 to 0.3% of the more reactive organic peroxides such as cumene hydroperoxide are preferred in low temperature polymerizations.

Furthermore, a total of 0.1–1.0 part (based on 100 parts of monomers charged) of a primary or tertiary aliphatic mercaptan having at least 6 and up to about 18 carbon atoms, e. g. hexyl, dodecyl, tetradecyl, or octadecyl mercaptan, or mixtures of $C_6$ to $C_{18}$ mercaptans, or other modifiers such as diisopropyl dixanthogen disulfide, are likewise beneficially present in the reaction mixture to promote the polymerization and to obtain polymers of predetermined plasticity. All of the modifier may be added to the emulsion at the beginning, but it is preferred to add only about 0.1 to 0.8 part to the initial charge and to introduce further amounts later, e. g. add another 0.1 to 0.5 part when total conversion has reached about 40 to 70%. As an alternative, the modifier may also be added continuously.

Other factors whereby the molecular weight of the product, reaction rate, or both, may be effected are polymerization temperature, monomer ratio, conversion, etc., as is well known per se. Furthermore, activation of the polymerization reaction may be accomplished by carrying out the polymerization in the presence of potassium ferricyanide, hydrocyanic acid or morpholine or in a so-called redox system such as is described, for example, in Industrial and Engineering Chemistry, vol. 40, pp. 770, 772, 773–777 and 932–937 (1948).

The invention is more fully illustrated by the following examples in which the term "parts" refers to "parts by weight."

EXAMPLE 1

The following charge was emulsified in a pressure container and polymerized at 45° C. for 16 hours:

25 parts butadiene–1,3
75 parts dimethyl itaconate
180 parts water
4 parts sodium oleate
0.3 part potassium persulfate
0.4 part lauryl mercaptan The resulting latex was short-stopped with 0.1 part or hydroquinone on monomers and coagulated with an aqueous solution of sodium chloride. The coagulated polymer was washed on a mill to free it of soap and other impurities and the washed polymer was mill-dried at 70° C. A transparent, colorless, flexible, thermoplastic, smooth sheet of polymer was obtained in a yield indicating 100% conversion of monomers to polymer. By analysis the product contained about 72 weight percent of combined dimethyl itaconate. Thin films having a tensile strength of 800 lbs./sq. in. and higher were readily obtained from the raw polymer by calendering.

The polymer was highly resistant to a variety of organic solvents as shown in Table I.

Table I

| Solvent | Solubility of Raw Polymer (24 Hours' Contact with Solvent) |
| --- | --- |
| Benzene | Highly swollen. |
| Ethyl acetate | Soluble. |
| Methylethyl ketone | Do. |
| Carbon tetrachloride | Insoluble. |
| Isopropanol | Do. |
| Ethyl ether | Do. |
| 10% sodium hydroxide | Do. |
| 10% sulfuric acid | Do. |
| Ethylene dichloride | Soluble. |
| Nitromethane | Do. |
| Varsol (Straight Run Mineral Spirits, Boiling Range 305–395° F., Specific Gravity 0.784 @ 60° F., Flash 105° F.). | Insoluble. |
| n-Heptane | Do. |

Solutions of the novel polymers in appropriate solvents, in concentrations of about 10 to 20% are useful as coating compositions. For example, when a 15% solution of this polymer in methyl-ethyl ketone was cast on polished steel panels and air-dried, protective films characterized by excellent oil and grease resistance, good hardness and flexibility, fair adhesion and caustic resistance, but of relatively poor resistance to soap and water were obtained. Coatings prepared by baking the cast films in an oven at 80° C. for 15 minutes had similar properties as those just mentioned except that the soap resistance of the baked film was materially improved. Baking of the novel unvulcanized resins at temperatures 60 and 100° C. for periods ranging from 5 minutes to 1 hour is generally helpful. Furthermore, it was found possible to get excellent adhesion of the dried film by adding about 5.0 parts of ethylene glycol or glycerol and a trace of acid catalyst such as toluene sulfonic acid, benzene sulfonic acid or sulfuric acid to the polymer solution before casting the films. About 0.01 to 1 part of toluene sulfonic acid is preferred.

The calendered polymer itself even without any further treatment such as was suggested above, showed excellent adhesion to fibrous materials such as paper, wood or cloth and was successfully used as a bonding agent therefor.

EXAMPLE 2

Other copolymers were prepared by polymerizing the following charges at 50° C. for 15 hours:

| Run No | A | B |
| --- | --- | --- |
|  | Parts | Parts |
| Butadiene-1,3 | 15 | 20 |
| Dimethyl itaconate | 85 | 80 |
| Sodium lauryl sulfate [1] | 4 | 4 |
| Water | 200 | 200 |
| Mercaptan Modifier [2] | 0.6 | 0.6 |
| Potassium Persulfate | 0.5 | 0.5 |
| Conversion, percent | 95 | 95 |

[1] Orvus paste.
[2] Lorol mercaptan (a mixture of $C_8$ to $C_{18}$ primary mercaptans containing a major proportion of lauryl mercaptan).

The polymeric products were recovered from the resulting latex and finished in the conventional manner described in Example 1. The polymers, compounded with 0.5 weight percent of 2,6-di-t-butyl-4-methyl phenol, were clear, tough, leathery, gave a smooth rolling bank on the mill and were taken off the mill as a smooth sheet similar in all respects to the product described in Example 1. By anaylsis product A contained about 80% and product B contained about 76% of combined dimethyl itaconate.

Sheets of these raw polymers pressed at 141° C. for 15 minutes had a tensile strength of 750 to 900 lbs. per sq. in. and an ultimate elongation of 150 to 250% (determined on test pads 6" x 6" x 0.075").

When polymer A was compounded for vulcanization and cured for ten minutes at 141° C. in a steam heated press, tensile values could not be determined since the cured stock was horny and too brittle to pull. By contrast, when polymer B was similarly compounded and cured, a strong, leather-like and flexible vulcanizate having the following properties was obtained:

| Cure Time (Min.) | Tensile, p. s. i. | Elongation, percent |
| --- | --- | --- |
| 10 | 1,980 | 320 |
| 20 | 2,400 | 240 |

These data indicate that the preferred polymers of the invention, when vulcanized, give resinous products having properties similar to plasticized Vinylite (vinyl chloride-vinyl acetate copolymer) compositions but superior thereto in dimensional stability and in resistance to various chemical agents. The following compounding formula was used above both with polymer A and polymer B:

|  | Parts |
| --- | --- |
| Polymer | 100 |
| Stearic acid | 1 |
| Zinc oxide | 5 |
| Sulfur | 1 |
| Tetramethyl thiuram disulfide | 1 |

EXAMPLE 3

When Example 2 was repeated using a butadiene/itaconate monomer ratio of 40/60, a soft, rough rubber-like product was obtained which had much poorer oil resistance than the polymers described above. The rubber-like product was very difficult to mill, possessed only a slight amount of thermoplastic behavior, and gave rough gnarled sheets. When compounded and cured according to the procedure stated in Example 2, an elastic vulcanizate having the following properties was obtained:

| Cure Time (Min.) | Tensile, p. s. i. | Elongation, percent |
| --- | --- | --- |
| 10 | 600 | 525 |
| 20 | 560 | 500 |

This example illustrates that copolymers of less than 65 percent dimethyl itaconate do not yield the tough resins desired in accordance with this invention, but instead lead to soft elastic products whose tensile strength is equal to only a fraction of the values characteristic of the polymers of the invention.

The high tensile strength of the novel polymers can be further increased by reinforcement with various fillers such as carbon black, various clays, calcium silicate, lignin or the like, or the polymers may be softened by blending with appropriate plasticizers such as dioctyl phthalate or tricresyl phosphate. Alternatively the novel polymers themselves may be used as plasticizers for various resins such as polymer or copolymers of vinyl chloride or acrylonitrile, to give compounds of improved processability but of substantially shorter elongation than is possessed by polyvinyl chloride stocks blended with conventional high molecular weight plasticizers such as the rubbery butadiene-acrylonitrile copolymers or with high molecular weight polyesters. For example, blends of vinyl chloride resins with about 5 to 35% of the novel polymers have good extrusion rates at about 140° C. and the resulting blends which are characterized by a short ultimate elongation are useful for the manufacture of unbreakable phonograph records and the like.

The solubility of vulcanized stocks containing 20% and 40% combined butadiene respectively were evaluated in a number of solvents. The solubility experiments were carried out with stocks which had been compounded in accordance with the recipe of Example 2 and which had been cured for 10 minutes at 141° C. The solubility of the two cured stocks were the same and were as shown in the following table:

| Solvent | Appearance of Stock after 24 Hours' Contact with Solvent |
|---|---|
| Benzene | Insoluble, slightly swollen. |
| Ethyl acetate | Do. |
| Methylethyl ketone | Do. |
| Ethylene dichloride | Do. |
| Nitromethane | Do. |

These data show that insolubilization had been effected by curing the polymers. The cured stocks were, of course, insoluble in all the solvents that did not attack the original, uncured polymer as described in Example 1 above.

The raw polymers showed little tendency toward resinification after 20 days' air oven aging at 60° C. Also, the polymers showed negligible discoloration after 200 hours' Fadometer exposure or 20 days' roof exposure.

EXAMPLE 4

Useful polymers of excellent tensile strength can also be prepared by copolymerizing a major proportion of dimethyl itaconate with minor amounts of butadiene and a third monomer such as styrene. Three-component polymers were obtained applying the polymerization procedure of Example 1 to polymerizable feeds having the composition indicated in the subjoined table. The products have been found to have the following properties:

| Run No | C | D |
|---|---|---|
| Feed and Polymer Composition (Parts): | | |
| Butadiene | 21 | 19 |
| Dimethyl itaconate | 63 | 55 |
| Styrene | 16 | 26 |
| Raw Stock (Sheets pressed out at 141° C. for 15 minutes): | | |
| Tensile | 670 | 570 |
| Percent Elongation | 1,930 | 620 |
| Cured Stock (Cured at 141° C. with 1% Tuads and 1.5% Sulfur; no loading or plasticizer): | | |
| 8 min. Tensile | 870 | 2,180 |
| Percent Elongation | 310 | 230 |
| 15 min. Tensile | 1,900 | 2,410 |
| Percent Elongation | 290 | 200 |
| 30 min. Tensile | 2,100 | 2,510 |
| Percent Elongation | 260 | 150 |

The data indicate that the polymers are very fast curing and that they have good strength in both cured and uncured states. Increased styrene content can be seen to stiffen the product by increasing its tensile strength and decreasing its elongation.

The dimethyl itaconate copolymers of this invention also offer a new source for the preparation of colloids of high molecular weight which form true solutions in water. Whereas the preparation of such water-soluble polymers by direct polymerization is practically impossible, it has now been discovered that the copolymers of this invention can be hydrolyzed or saponified with alkali, etc. whereby the copolymers are converted into methyl alcohol and the corresponding at least partially water-soluble cationic derivatives of the copolymer.

As long as the copolymer contains a major proportion of and preferably at least 60 or 65 weight percent of the vinyl ester by weight, the saponification can be accomplished by merely heating the polymer in the presence of 0.5 to 1.5 mol equivalents of aqueous alkali based on the combined ester content of the polymer at a temperature between about 50 and 120° C., i. e. at a temperature high enough for removal of the alcohol which forms the itaconic acid ester. Where water-soluble derivatives are desired, about 0.9 to 1.2 mol equivalents of alkali should be used so as to effect substantially complete saponification. In certain cases it may be advisable to add small amounts of solvent, e. g. 1 to 10 parts of benzene or toluene based on the weight of dry polymer before the alkali treatment in order to swell the polymer and facilitate the saponification process. Such reagents as potassium, sodium or ammonium hydroxide or basic amines such as morpholine, alkyl amines, or polyvalent metal bases, e. g. Ca(OH)$_2$, MgO and the like may be used as saponification agents. The saponification process may be carried out while the polymer is in latex form although such problems as foaming, polymer recovery and soap removal make this procedure somewhat less desirable than that involving the dry, washed polymer. The alkali salts may be treated with hydrochloric or sulfuric acid to convert all or part of the sodium ions into hydrogen ions.

The water soluble polymers may be used for a number of applications such as paper impregnation, sizing and stiffening; or they may be used as detergents, as latex thickeners or as creaming agents. Then, too, the polyvalent metal derivatives may be prepared which may be of interest as lube oil and grease additives.

Examples illustrating the preparation of these soluble metal derivatives of the novel polymers are given below.

EXAMPLE 6

125 grams of a dry polymer obtained as described in Example 1 above was placed in a reaction flask with 1040 mls. of 1.0353 N potassium hydroxide solution, this being the stoichiometric amount of caustic required for complete saponification of the ester groups contained in the polymer. After heating the mixture with agitation for 6 hours at 75° C., a clear slightly viscous solution was obtained. This solution had the appearance and behavior of an ordinary sodium stearate soap solution and partial precipitation of polymer therefrom could be obtained by addition of a strong acid such as hydrochloric acid. When dried the aqueous solution of saponified polymer gave a soft sticky product which corresponded to the sodium salt of a copolymer of butadiene and itaconic acid. In contrast the neutralized precipitated polymer which corresponded to a copolymer of butadiene and itaconic acid was a hard brittle resin.

When an aqueous solution of the saponified polymer, i. e. the potassium salt, was treated with solutions of various polyvalent metal salts such as zinc chloride, magnesium chloride, aluminum sulfate, barium chloride or calcium chloride, waxy precipitates were thrown out of solution which were the corresponding polyvalent metal salts of the saponified polymers. These polymeric polyvalent metal salts, especially when derived from itaconate-butadiene copolymers which had been only partially saponified so that, for example, about 50 to 80% of the ester groups originally present in the polymer are left unaffected, can be prepared in a form soluble in mineral oil or in greases and may be used as valuable additives in conjunction therewith.

EXAMPLE 7

A copolymer of 100% conversion containing 15 parts of butadiene and 85 parts of dimethyl itaconate was prepared as described in Example 2A and saponified as described in Example 6, except that the amount of potassium hydroxide used was increased to correspond stoichiometrically with the higher ester content of this polymer. When small portions, e. g. 0.05 to 2 percent of the saponified polymer or a water solution thereof were added to various latices, e. g. a Hevea rubber latex, a synthetic latex of GR–S or GR–A rubber or to latices of vinyl chloride polymers, a very pronounced thickening of the several latices was accomplished, and thereby the spreading and dipping characteristics of the latices were improved.

By contrast, attempts to saponify a copolymer containing 40 parts of dimethyl itaconate and 60 parts of butadiene, prepared and isolated substantially as described in Example 1, were unsuccessful. This polymer could not be converted into a water soluble product by saponification although the reaction mixture containing the polymer and 2 mols of alkali per mol of dimethyl itaconate combined in the polymer was heated for 24 hours at 80 to 90° C.

In another run a copolymer containing 60 parts of dimethyl itaconate and 40 parts of styrene was prepared and isolated substantially as described in Example 1. This polymer also could not be saponified sufficiently to form a water soluble product even after the polymer-alkali mixture was heated for 24 hours at 80 to 90° C. Thus, it has been shown that not only the proportion of combined ester is critical for the purposes of this aspect of the invention, but, most surprisingly, the chemical nature of the monomer with which the itaconic ester has been copolymerized is critical as far as the saponification characteristics of the resulting copolymers are concerned.

This application is a continuation-in-part of Serial No. 92,088, filed May 7, 1949, now Patent 2,619,477.

It has also been found, and is a further feature of this invention, that the hydrolyzed polymers of this invention have activity as "soil conditioners." This activity may be tested in various ways. Specifically, the test used here involved adding 50 grams of 20–50 mesh clay soil to a 100 ml. graduate containing 0.025 to 0.1 gram of polymer dissolved in 50 ml. of water. After adjusting the total volume to 100 ml., the soil was thoroughly dispersed by agitation. The soil settling rate, sediment volume and appearance of the supernatant liquid was then observed over a 24 hour period. This test gives some measure of "conditioner" activity, and indicates to some extent the degree of soil aggregation.

Two polymers, prepared according to the procedure given in Example 1, were used. The monomer charges, in parts by weight, were:

|  | A | B |
|---|---|---|
| Dimethyl Itaconate | 75 | 65 |
| Butadiene-1,3 | 25 | 20 |
| Styrene |  | 15 |
|  | 100 | 100 |

Yields were quantitative. The polymers were coagulated with brine, water washed and then dissolved in acetone. After determining the solids contents of the acetone solutions, measured volumes were withdrawn and placed in a distillation flask equipped with a magnetic stirrer. A small amount of isopropyl alcohol and sufficient caustic soda were added (as a concentrated aqueous solution) to completely saponify the ester groups. The mixture was heated to reflux and as acetone was taken off overhead through a short column, water was added intermittently to the flask, to make a final concentration of about 5% aqueous solution of the metal salt of the polyacid, the saponification being complete after 2–4 hours, and all the acetone, $C_3H_7OH$ and $CH_3OH$ being taken overhead. Aliquots of this solution were used in subsequent tests with clay soil. Specific results are given below:

| Polymer | A | | | B | |
|---|---|---|---|---|---|
| Salt | Potassium | | | Sodium | |
| Wt. Percent Salt on Soil | 0 | 0.10 | 0.20 | 0.10 | 0.20 |
| Volume of Soil Sediment in ml. at: | | | | | |
| ½ Hr | 15 | 25 | 25 | 45 | 62 |
| 1 Hr | 30 | 40 | 35 | 63 | 60 |
| 16 Hrs | 47 | 53 | 53 | 60 | 59 |
| 24 Hrs | 47 | 51 | 52 | 60 | 59 |
| Appearance of Supernatant Liquid [1] at: | | | | | |
| ½ Hr | 10 | 4 | 4 | 2 | 2 |
| 1 Hr | 9 | 4 | 3 | 1 | 1 |
| 16 Hrs | 8 | 1 | 1 | 1 | 1 |
| 24 Hrs | 8 | 1 | 1 | 1 | 1 |

[1] 1—clear, no suspended soil; 10—muddy, large amount of suspended soil.

These data demonstrate that salts of hydrolyzed itaconate polymers have a favorable effect on the clay soil, the increased volume of sediment being a measure of a desirable increase in the degree of soil aggregation.

While certain preferred embodiments of the invention have been described above, it will be apparent to those skilled in the art that various modifications may be made therein without departing from the spirit of the invention or from the scope of the appended claims.

What is claimed is:

1. A product comprising a salt of a copolymer of 65 to 90 parts dimethyl itaconate and 35 to 10 parts of a diolefin of 4 to 6 carbon atoms, the cation of said salt being selected from the group consisting of metals, ammonium and basic amine radicals.

2. A monovalent metal salt of a copolymer comprising 65 to 90% by weight of dimethylitaconate and 35 to 10% by weight of butadiene-1,3.

3. A water-soluble sodium salt of a copolymer comprising 65 to 85% by weight of dimethylitaconate and 35 to 10% by weight of butadiene-1,3.

4. A copolymer of 65 to 90 parts of dimethyl itaconate and 35 to 10 parts of butadiene-1,3 wherein 20 to 50% of the ester methyl groups have been replaced by calcium.

5. A method of preparing metal derivatives of high molecular weight which comprises saponifying a resinous copolymer of 65 to 90 parts of dimethyl itaconate and 35 to 10 parts of a $C_4$ to $C_6$ conjugated diolefin with 0.5 to 1.5 mol equivalents of strong aqueous alkali.

6. A method of preparing water soluble colloids which comprises heating a resinous copolymer of 65 to 90 parts of dimethyl itaconate and 35 to 10 parts butadiene-1,3 with 0.9 to 1.2 mol equivalents of aqueous potassium hydroxide at a temperature between 50 and 120° C. in the presence of 1 to 10 parts of benzene until the ester groups of the copolymer become substantially completely saponified.

References Cited in the file of this patent

UNITED STATES PATENTS

| 2,294,226 | D'Alelio | Aug. 25, 1942 |
| 2,384,569 | Semon | Sept. 11, 1945 |
| 2,600,680 | Park | June 17, 1952 |
| 2,625,529 | Hedrick et al. | Jan. 13, 1953 |